(12) United States Patent
Kadiyala et al.

(10) Patent No.: US 12,248,483 B2
(45) Date of Patent: Mar. 11, 2025

(54) SYSTEMS AND METHODS FOR CONNECTING APPLICATIONS BASED ON EXCHANGED INFORMATION

(71) Applicant: JPMORGAN CHASE BANK, N.A., New York, NY (US)

(72) Inventors: Vijaya Kadiyala, Hyderabad (IN); Radhika Gurrala, Hyderabad (IN)

(73) Assignee: JPMORGAN CHASE BANK, N.V., New York, NY (US)

(*) Notice: Subject to any disclaimer, the term of this patent is extended or adjusted under 35 U.S.C. 154(b) by 71 days.

(21) Appl. No.: 17/331,435

(22) Filed: May 26, 2021

(65) Prior Publication Data
US 2022/0035809 A1 Feb. 3, 2022

(51) Int. Cl.
*G06F 16/2458* (2019.01)
*G06F 9/54* (2006.01)
*G06F 16/23* (2019.01)

(52) U.S. Cl.
CPC .......... *G06F 16/2465* (2019.01); *G06F 9/541* (2013.01); *G06F 16/2379* (2019.01)

(58) Field of Classification Search
CPC ................ G06F 9/05; G06F 16/2465; G06F 16/2379; G06F 9/541
See application file for complete search history.

(56) References Cited

U.S. PATENT DOCUMENTS

| | | | |
|---|---|---|---|
| 10,642,719 B1* | 5/2020 | Balasubramanian | G06F 11/3466 |
| 10,929,211 B1* | 2/2021 | Mylavarapu | G06F 11/3466 |
| 2014/0237610 A1* | 8/2014 | Vandervort | G06F 21/60 726/26 |
| 2014/0372539 A1* | 12/2014 | Zaveri | H04L 51/52 709/206 |
| 2015/0227450 A1* | 8/2015 | Brodsky | G06F 11/3612 714/38.1 |
| 2019/0327154 A1* | 10/2019 | Sahoo | H04L 43/045 |
| 2021/0019381 A1* | 1/2021 | Kurimura | G06F 21/105 |
| 2021/0286895 A1* | 9/2021 | Yang | G06F 21/563 |

* cited by examiner

*Primary Examiner* — Brittany N Allen
*Assistant Examiner* — William P Bartlett
(74) *Attorney, Agent, or Firm* — GREENBERG TRAURIG LLP (57) ABSTRACT

Systems and methods for connecting applications based on exchanged information are disclosed. According to one embodiment, a method may include: (1) receiving, by a data mining computer program, application information for a plurality of applications in an organization; (2) receiving, by the data mining computer program, application details for each application comprising application programmable interface (API) used by each application; (3) receiving, by the data mining computer program, API information for each API in the application details; (4) populating, by the data mining computer program, an application data objects table for each application; (5) creating, by the data mining computer program, parent-child relationships for the plurality of applications based on the application data objects table; and (6) generating, by the data mining computer program, an application dependency graph for the parent-child relationships.

10 Claims, 5 Drawing Sheets

SYSTEMS AND METHODS FOR CONNECTING APPLICATIONS BASED ON EXCHANGED INFORMATION

RELATED APPLICATIONS

This application claims priority to, and the benefit of, Indian Patent Application Ser. No. 202011033034, filed Jul. 31, 2020, the disclosure of which is hereby incorporated, by reference, in its entirety.

BACKGROUND OF THE INVENTION

1. Field of the Invention

Embodiments relate generally to systems and methods for connecting applications based on exchanged information.

2. Description of the Related Art

Finding application dependencies is generally a manual process. For example, application teams work with different stakeholders to create dependency diagrams. Every time when there is a change in the way data is exchanged between the applications, the Application teams need to re-certify and reconcile. Maintaining this kind of information for a couple of applications is possible, but for becomes much more daunting at an enterprise level.

SUMMARY OF THE INVENTION

Systems and methods for connecting applications based on exchanged information are disclosed. According to one embodiment, a method may include: (1) receiving, by a data mining computer program, application information for a plurality of applications in an organization; (2) receiving, by the data mining computer program, application details for each application comprising application programmable interface (API) used by each application; (3) receiving, by the data mining computer program, API information for each API in the application details; (4) populating, by the data mining computer program, an application data objects table for each application; (5) creating, by the data mining computer program, parent-child relationships for the plurality of applications based on the application data objects table; and (6) generating, by the data mining computer program, an application dependency graph for the parent-child relationships.

In one embodiment, the application information may be received from one or more of an entitlements repository, an API document, an internal catalog table, and an application log file.

In one embodiment, the method may further include a direction of data sharing from the application information.

In one embodiment, the application details may include a technology stack used by the application and a code repository used by the application.

In one embodiment, the API information may identify information extract and a type of information to mine.

In one embodiment, the application data objects table may include an object owner, an object key, and an object type.

In one embodiment, the parent-child relationships are based on object keys, object owners, and application identifiers in the application data objects table.

In one embodiment, the method may further include outputting, by the data mining computer program, a graphical representation of the dependency graph, wherein the graphical representation identifies a direction of data sharing between applications.

According to another embodiment, an electronic device may include a computer processor and a memory storing a data mining computer program. The data mining computer program may be configured to: receive application information for a plurality of applications in an organization; receive application details for each application comprising application programmable interface (API) used by each application; receive API information for each API in the application details; populate an application data objects table for each application; create parent-child relationships for the plurality of applications based on the application data objects table; and generate an application dependency graph for the parent-child relationships.

In one embodiment, the application information may be received from one or more of an entitlements repository, an API document, an internal catalog table, and an application log file.

In one embodiment, the data mining computer program may be further configured to identify a direction of data sharing from the application information.

In one embodiment, the application details may include a technology stack used by the application and a code repository used by the application.

In one embodiment, the API information identifies information extract and a type of information to mine.

In one embodiment, the application data objects table may include an object owner, an object key, and an object type.

In one embodiment, the parent-child relationships are based on object keys, object owners, and application identifiers in the application data objects table.

In one embodiment, the data mining computer program may be further configured to output a graphical representation of the dependency graph, wherein the graphical representation identifies a direction of data travel between applications.

According to another embodiment, a system may include an electronic comprising a computer processor and executing a data mining computer program; an entitlements repository; an application programmable interface (API) repository; an internal catalog table; and an application log file. The data mining computer program may receive application information for a plurality of applications in an organization from one or more of the entitlements repository, the API repository, the internal catalog table, and the application log file and determines a direction of data sharing between applications; may receive application details for each application comprising APIs used by each application, wherein the application details may include a technology stack used by the application and a code repository used by the application; may receive API information for each API in the application details, wherein the API information identifies information extract and a type of information to mine; may populate an application data objects table for each application, wherein the application data objects table may include an object owner, an object key, and an object type; may create parent-child relationships for the plurality of applications based on the application data objects table; and may generate an application dependency graph for the parent-child relationships.

In one embodiment, the parent-child relationships are based on object keys, object owners, and application identifiers in the application data objects table.

In one embodiment, the system may further include a graphing computer program, wherein the graphing computer program generates a graphical representation of the dependency graph, wherein the graphical representation identifies a direction of data travel between applications.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments relate generally to systems and methods for connecting applications based on exchanged information. For example, embodiments may capture all the application level dependencies at design time, may define what the critical batch flows that that requires end to end monitoring, and may capture and monitor end to end batch flows.

In one embodiment, systems may connect applications based on exchanged data using the following exemplary protocols: (1) database to database data exchange using database links or data federation or virtualization; (2) server to server data exchange using secure file transmission; (3) data exchange thru real-time Kafka or message queues; (4) data exchange thru API; and (5) data exchange using JDBC/ODBC connection from ETL applications; etc.

Embodiments may be based on advanced technologies, such as GraphDB and Angular with D3. Embodiments may use APIs that can be plugged into any other applications with different technology stacks.

Figure 1:
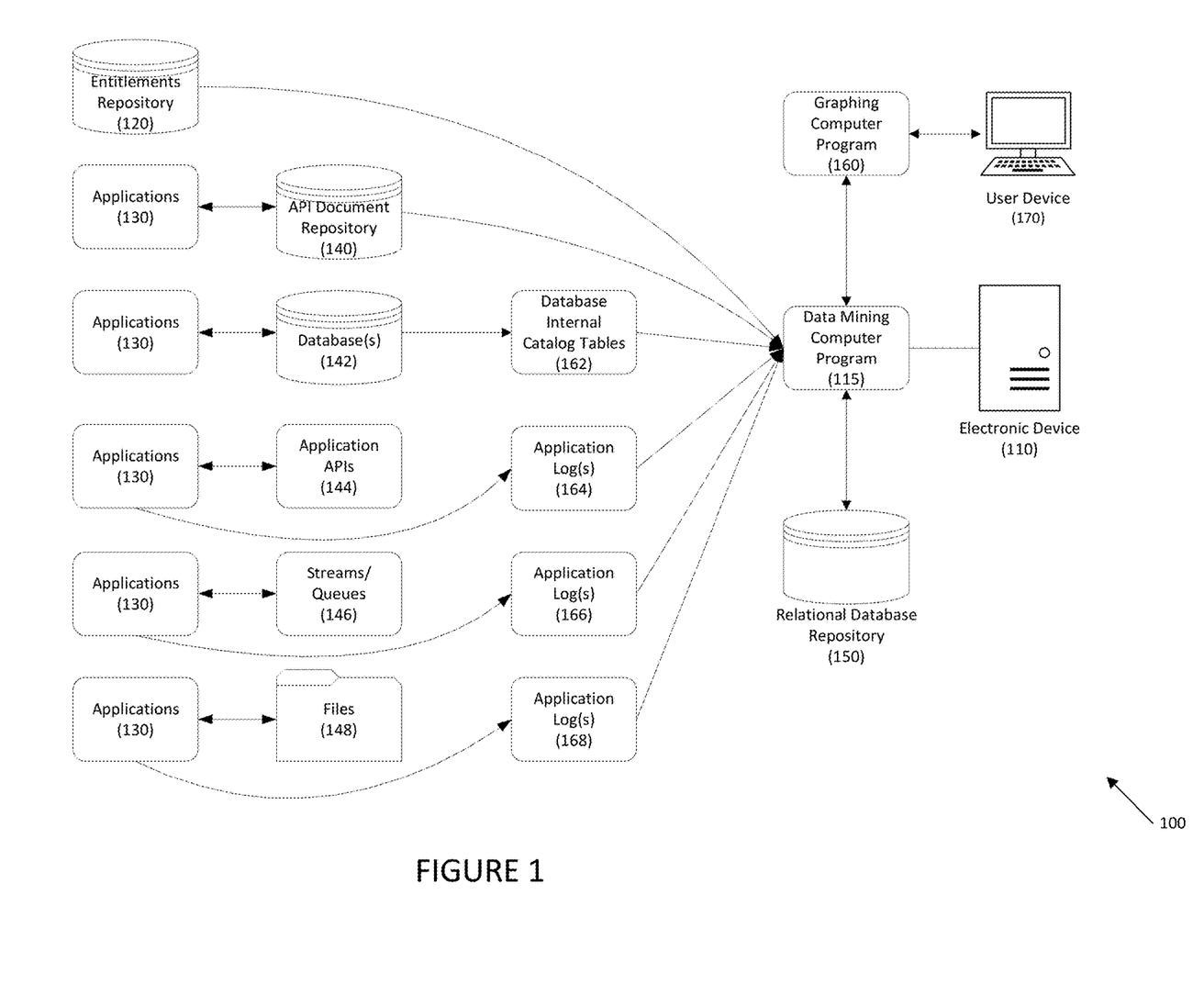
FIG. 1 depicts a system for connecting applications based on exchanged information according to an embodiment.

Referring to FIG. 1, a system for connecting applications based on exchanged information is disclosed according to an embodiment. System 100 may include electronic device 110 that may execute data mining computer program 115. Electronic device 110 may be a server (e.g., physical server, cloud-based server, combinations, etc.), a workstation, a desktop, laptop, notebook, or tablet computer, etc. Electronic device 110 may include one or more computer processors (not shown) and a memory (not shown).

System 100 may further include entitlements repository 120 that may store entitlements (e.g., access permissions) for human users, computer program or application users, etc. In one embodiment, entitlements repository 120 may store a table or similar that associates a user or groups of users with access to a resource, such as a program, a storage location, etc.

System 100 may include a plurality of applications 130. Application 130 may be any suitable type of application. Examples of applications 130 include ETL (Extract, Transform, Load) applications, ELT (Extract, Load, Transform) applications, Big Data applications (e.g., developed using Python, Spark, Scala, Databases, SQLs, Informatica, AB Initio, etc., graphical use interface applications, such as those developed using .NET, Java, etc.

Applications 130 may information to different locations. For example, application 130 may publish supported application programmable interfaces (APIs) to API document repository 140.

Application 130 may record information regarding applications connected to one or more databases 142 using, for example, JDC/ODBC protocols to database/internal catalog tables 162. For example, when an application executes a database operation, the information may be recorded into database/internal catalog tables 162. The information may identity the application, the database, the direction of data flow, the asset(s) being shared, etc. The information may identify the databases and tables the application is using, whether the application is reading the data from the tables or writing the data to the tables, which applications are performing these read and write operations, etc.

Application 130 may write invoked third party/other APIs 144 to application log file 164, may write reads and writes to streams/queues 146 third party/other APIs 144 to application log file 166, and may write reads and writes to files 168 to application log file 168. For example, when an application connects to a database to read/write data, reads/writes data to files 148, reads/writes data to streams or queues 146, the operations may be recorded in application log files 164, 166, and 168. Application log files 164, 166, and 168 may be spread across many servers and in various formats. For example, the information may identity the application, the API invoked, the database, the stream/queue, the file, etc., the direction of data flow, the asset(s) being shared, etc.

Data mining computer program 115 may receive data from one or more of entitlements repository 120, API document repository 140, database internal catalog tables 162, and application log files 164, 166, and 168. Data mining computer program 115 may extract data from these sources and may apply text mining techniques to identify application connection points. The application connection points may be stored in a parent-child hierarchy in relational database 150. Data mining computer program 115 may then generate and output a graphical representation of the connections, including a direction of data flow between applications 130, using graphing computer program 160. For example, the graphical representation may be output on user device 170, which may be any suitable computing device. A user may interact with the graphical representation, including viewing the connections for a single application 130, or may view the application connections for an organization.

Figure 2:
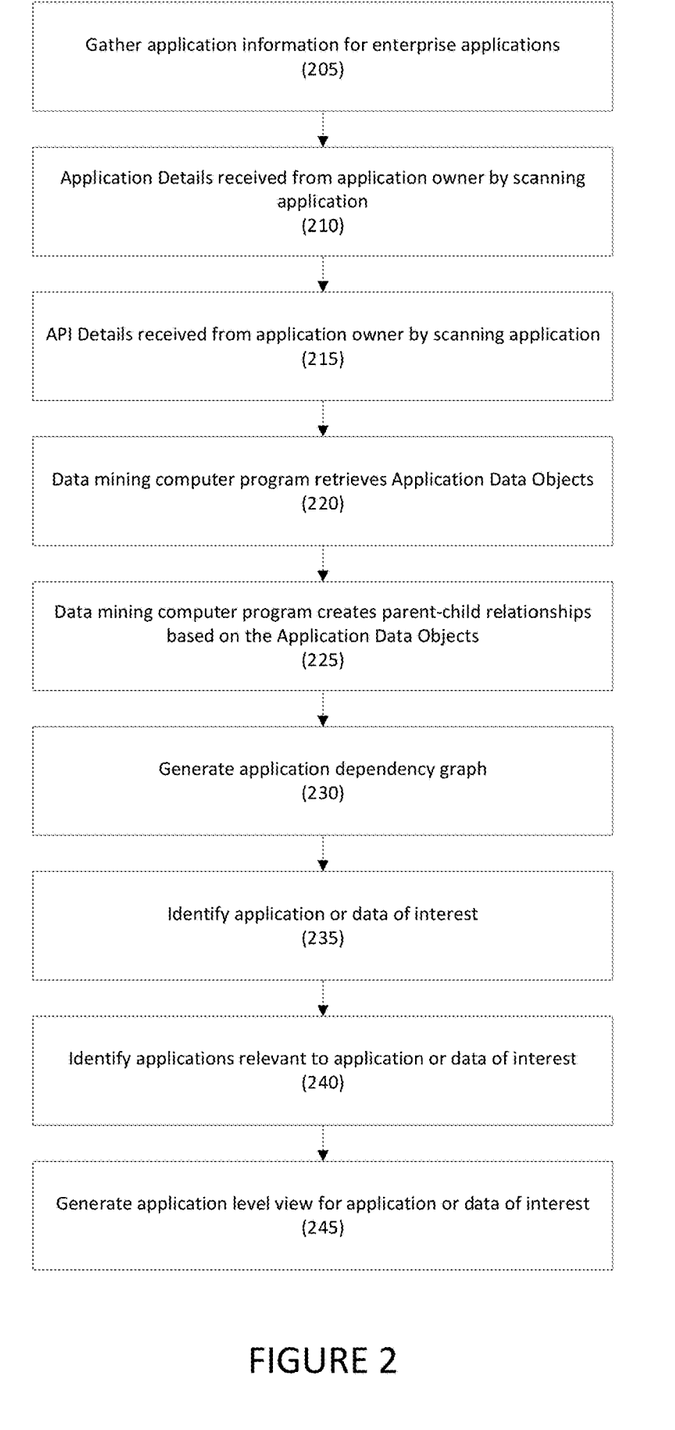
FIG. 2 depicts a method for connecting applications based on exchanged information according to an embodiment.

Referring to FIG. 2, an exemplary method for generating an application level view is provided according to one embodiment. In step 205, application information for an organization's applications may be collected. For example, the application information may be collected from an entitlements repository, an API document repository, databases/internal catalog tables, application log files, files, application identifiers, configuration files, etc.

The data mining computer program may apply data mining techniques to the application information to identity application connections, direction of data sharing (e.g., source and destination application), etc. In one embodiment, the data mining computer program may store application connection points to a relational database in a parent-child hierarchy. The application connection points may identify applications that are connected to each other and sharing assets with each other, such as APIs, databases, files, streams, queue or files.

For example, in step 210, an application owner or similar individual may provide details about an application, such as the technology stacks (e.g., APIs) used as part of the application, the code repository, etc. The application owner or similar individual may further provide access details for accessing the code repository with, for example, read-only credentials.

An example Application Details table is provided below:

| App Identifier | App Name | API | Code Repository | Repository Access Details |
|---|---|---|---|---|
| 12345 | App1 | API 1 | /home/ccd/informatica | ********** |
| 12345 | App2 | API 2 | /abc/graphs/psets | ********** |
| 34567 | App3 | API 1 | /home/apps/code/INF | ********** |
| 45678 | App4 | API 3 | /home/apps/code/data | ********** |

In one embodiment, the data mining computer program may scan the code repository to identify the application details.

In step 215, once the application details are captured, the application owner or similar individual may provide details on the APIs, such as what to look for, what to extract, what type of information to mine. An example API Details table is provided in the table below:

| API | Look For | Extract | Type |
|---|---|---|---|
| API 1 | ATTRIBUTE NAME = "Connection Information: | VALUE= | Connection |
| API 1 | TABLE ATTRIBUTE NAME = "Connection Information" | VALUE= | Connection |
| API 1 | TARGET BUSINESS NAME = "" | DATABASE TYPE= | Target Object |
| API 1 | SOURCE BUSINESS NAME = "" | DATABASE TYPE= | Source Object |
| API 1 | ATTRIBUTE NAME = "Log File Directory" | VALUE= | Log Directory |
| API 1 | < ATTRIBUTE NAME = "Log File Directory | VALUE= | Log File Name |
| API 2 | INPUT_FILE_NAME | | Source File Name |
| API 2 | TARGET_FILE_NAME | | Target File Name |
| API 2 | INPUT_TABLE_NAME | | Source Table Name |
| API 2 | TARGET_TABLE_NAME | | Target Table Name |
| API 3 | FROM | | Source Table Name |

In step 220, using the "Application Details" table, the data mining computer program may identify the code repository to scan and using the API Details table, may retrieve details on what to look for and what to extract. After cleaning and summarizing the data, the data mining computer program may populate the data into an Application Data Objects table as shown in below.

| App Identifier | App Name | Object Owner? | Object Key | Object type |
|---|---|---|---|---|
| 12345 | App1 | No | /data/CreditCard/Client/Client_Details.dat | File |
| 12345 | App1 | Yes | /data/CreditCard/Client/Credit_Card_Transactions.dat | File |
| 12345 | App1 | Yes | CARDDB.CLIENT_TRANSACIONS_AGGR | Table |
| 12345 | App1 | Yes | CARDDB.ACCOUNT_TRANSACIONS_AGGR | Table |
| 34567 | App2 | Yes | ACCTDB.ACCOUNT_DETAILS | Table |
| 34567 | App2 | Yes | ACCTDB.CLIENT_DETAILS | Table |
| 34567 | App2 | Yes | ACCTDB.KYC_DETAILS | Table |
| 34567 | App2 | Yes | /data/CreditCard/Client/Client_Details.dat | File |
| 45678 | App3 | No | CARDDB.ACCOUNT_TRANSACIONS_AGGR | Table |
| 45678 | App3 | No | ACCTDB.CLIENT_DETAILS | Table |

This table identifies the Application (App) Identifier, the object(s) are used in the application, and the type of object. Once the data is available, the application owner or similar may certify that the object is owned by the application, or if it is not owned by the application. The certification may be manual, automated, etc.

In step 225, the data mining computer program may create parent-child relationships based on the Object Key column, the Object Owner column, and the App Identifiers to create an Application Data Dependency Details table. An example Application Data Dependency Details table is provided below:

| Sender App Name | Object | Object Type | Receiving App Name |
|---|---|---|---|
| App2 | ACCTDB.CLIENT_DETAILS | Table | App3 |
| App1 | CARDDB.ACCOUNT_TRANSACIONS_AGGR | Table | App3 |
| App2 | /data/CreditCard/Client/Client_Details.dat | File | App1 |

In step 230, an application dependency graph may be generated for the organization's applications using, for example, the Application Dependency Details table. In one embodiment, this may be generated using an open-source tool. In one embodiment, the application dependency graph may identify the application(s), the asset shared, the direction of sharing, etc.

In step 235, a user may identify an application or data of interest. In another embodiment, a user may query a service level agreement or a metadata table. In one embodiment, the applications and/or data may be identified based on metadata.

In step 240, the application(s) that are relevant to the application or data of interest may be identified. For example, any application that provides data that may be used to generate the output of the data or application of interest may be identified. In one embodiment, the data sets may be tagged in each application. For example, the tables that are part of the application may be tagged to with subjects (e.g., in a banking environment, subjects may include Card Transaction, Credit card Account, etc.).

In step 235, an application level view for the application or data may be generated. For example, any organization applications that are not relevant to the application or data of interest may be removed from the application dependency graph.

Figure 3:
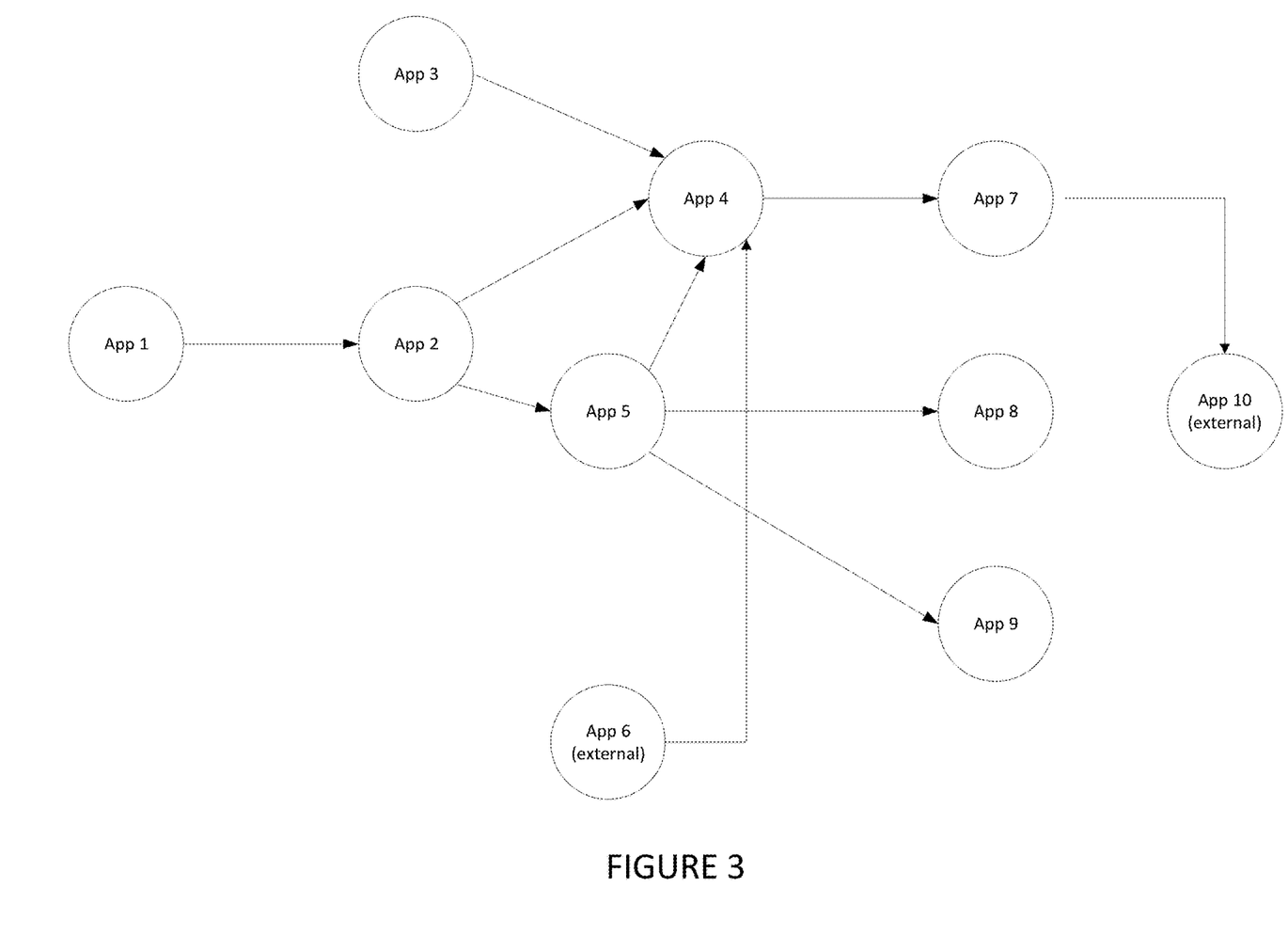
FIG. 3 depicts an exemplary application level view according to one embodiment.

Referring to FIG. 3, an exemplary application level view is provided according to one embodiment. A plurality of applications (e.g., App 1, App 2, . . . App 10) are illustrated. This Level 1 (L1) diagram illustrates which applications send and/or receive data. For example, App 2 may communicate data to App 2, which may communicate data to both App 4 and App 5, etc.

In one embodiment, the exemplary application level view provides an assumed flow between different applications for a specific application, such as App 10.

Figure 4:
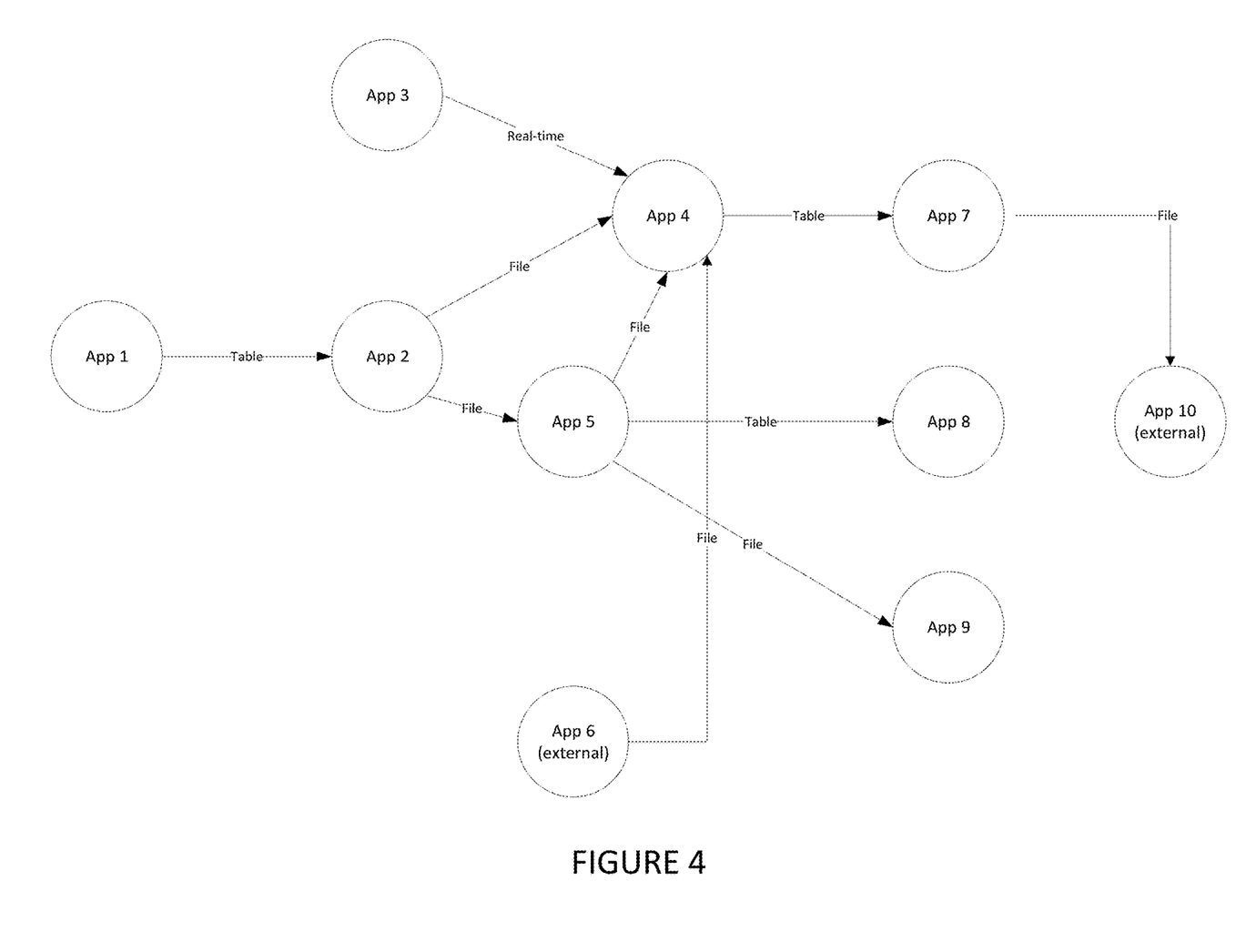
FIG. 4 depicts an exemplary data exchange level view according to an embodiment.

Referring to FIG. 4, an exemplary data exchange level view is provided according to one embodiment. This Level 2 (L2) diagram depicts the different types of data (e.g., data set (table), data set (file), and real-time data that is sent between applications. This data exchange level view assists in viewing how data from different applications can contribute to a file or table. It provides an end-to-end view.

For example, when identifying application dependencies using, for example, an identifier that may be used to access data sets, the identifier may identify which data set (e.g., file(s)) the application is accessing. Using data set tagging, the flow may be created.

In one embodiment, the data flow may be monitored.

Figure 5:
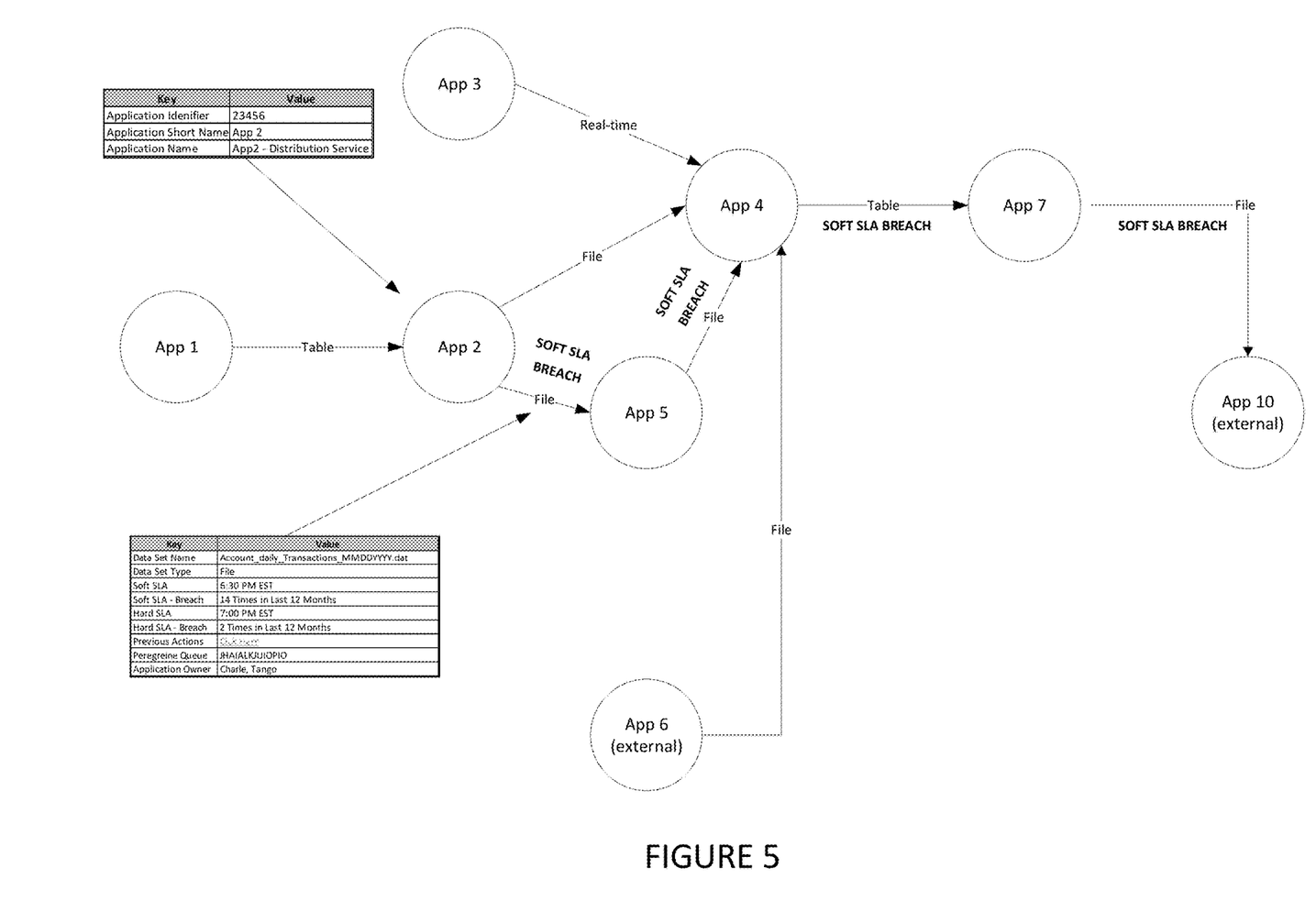
FIG. 5 depicts an exemplary critical end-to-end batch flow at run time according to an embodiment.

Referring to FIG. 5, an exemplary critical end-to-end batch flow at run time is depicted. In one embodiment, additional information on an application (e.g., App 3) and a data set that are suffering a SLA breach are depicted. For example, the App 3 application identifier, application Short-Name, and Application Name may be provided. Additional or different information may be provided as is necessary and/or desired. Similarly, information on the data set provided by App 3 to App 5 may be provided. For example, the data set name, data set type, when the soft SLA breach occurred, the number of occurrences of a soft SLA breach during a period of time, the number of occurrences of a hard SLA breach during a period of time, previous actions taken in response to the SLA breaches and Hard SLA breaches, any tickets/reference numbers to the issue, and the application owner.

For example, if the process breaches a hard SLA, it will have downstream impact. A soft SLA breach, however, may delay the process, but it is possible to catch up in downstream application. A soft SLA may be analogized to a warning signal, and a hard SLA may require attention to investigate and fix the issue.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:
    identifying, by a data mining computer program, a plurality of applications in an organization;
    accessing, by the data mining computer program, a plurality of code repositories comprising code used by the plurality of applications using read-only credentials for each code repository;
    scanning, by the data mining computer program, the code for application programmable interface (API) information for APIs used by each application, wherein the API information comprises a query for the API, an extraction object for the API, and a type of information to mine;
    populating, by the data mining computer program, an application data objects table for the applications with objects, object keys, and object types by scanning the code repository for each application with the query for the APIs, an extraction object for the APIs, and the type of information to mine;
    automatically certifying, by the data mining computer program, an ownership status for each object in the application data objects table;
    creating, by the data mining computer program, parent-child relationships for the plurality of applications based on the application data objects table, wherein the parent-child relationships are based on object keys, object owners, and application identifiers in the application data objects table; and
    generating, by the data mining computer program, an application dependency graph for the parent-child relationships.

2. The method of claim 1, further comprising:
    receiving, by the data mining computer program, application details for the plurality of applications from one or more of an entitlements repository, an API document, an internal catalog table, and an application log file.

3. The method of claim 2, further comprising:
    identifying, by the data mining computer program, a direction of data sharing from the application details.

4. The method of claim 1, further comprising:
    outputting, by the data mining computer program, a graphical representation of the application dependency graph, wherein the graphical representation identifies a direction of data sharing between applications.

5. An electronic device, comprising:
    a computer processor; and
    a memory storing a data mining computer program;
    wherein the data mining computer program is configured to:
        identify a plurality of applications in an organization;
        access a plurality of code repositories comprising code used by the plurality of applications using read-only credentials for each code repository;
        scan the code for application programmable interface (API) information for APIs used by each application, wherein the API information comprises a query for the API, an extraction object for the API, and a type of information to mine;
        populate an application data objects table for the applications with objects, object keys, and object types by scanning the code repository for each application with the query for the APIs, an extraction object for the APIs, and the type of information to mine;
        automatically certify an ownership status for each object in the application data objects table;
        create parent-child relationships for the plurality of applications based on the application data objects table, wherein the parent-child relationships are based on object keys, object owners, and application identifiers in the application data objects table; and
        generate an application dependency graph for the parent-child relationships.

6. The electronic device of claim 5, wherein the data mining computer program is further configured to receive application details for the plurality of applications from one or more of an entitlements repository, an API document, an internal catalog table, and an application log file.

7. The electronic device of claim 6, wherein the data mining computer program is further configured to identify a direction of data sharing from the application details.

8. The electronic device of claim 5, wherein the data mining computer program is further configured to output a graphical representation of the application dependency graph, wherein the graphical representation identifies a direction of data travel between applications.

9. A system, comprising:
    an electronic device comprising a computer processor and executing a data mining computer program;
    an entitlements repository;
    an application programmable interface (API) repository;
    an internal catalog table;
    a code repository comprising code that is used by each of a plurality of applications; and
    an application log file;
    wherein:
        the data mining computer program identifies a plurality of applications in an organization from one or more of the entitlements repository, the API repository, the internal catalog table, and the application log file and determines a direction of data sharing between applications;
        the data mining computer program accesses a plurality of code repositories comprising code used by the plurality of applications using read-only credentials for each code repository;
        the data mining computer program scans the code for API information used by each application, wherein the API information comprises a query for the API, an extraction object for the API, and a type of information to mine;
        the data mining computer program populates an application data objects table for the applications with objects, object keys, and object types by scanning the code repository for each application with the query for the APIs, an extraction object for the APIs, and the type of information to mine;

the data mining computer program automatically certifies an ownership status for each object in the application data objects table;

the data mining computer program creates parent-child relationships for the plurality of applications based on the application data objects table, wherein the parent-child relationships are based on object keys, object owners, and application identifiers in the application data objects table; and the data mining computer program generates an application dependency graph for the parent-child relationships.

10. The system of claim 9, further comprising a graphing computer program, wherein the graphing computer program generates a graphical representation of the application dependency graph, wherein the graphical representation identifies a direction of data travel between applications.

* * * * *